United States Patent Office 3,850,934
Patented Nov. 26, 1974

3,850,934
6,7,8,9-TETRAHYDRO-7a,11a-ETHANOOXYINDOLO [1,2-h][1,7]NAPHTHYRIDIN-10(11H)-ONES
David Llewellyn Coffen, Glen Ridge, and David Allen Katonak, Clifton, N.J., assignors to Hoffmann-La Roche Inc., Nutley, N.J.
No Drawing. Filed June 8, 1973, Ser. No. 368,430
Int. Cl. C07d 39/10
U.S. Cl. 260—293.53                                7 Claims

ABSTRACT OF THE DISCLOSURE 6,7,8,9 - tetrahydro - 7a,11a - ethanooxyindolo[1,2-h] [1,7]naphthyridin-10(11H)-ones, prepared from the corresponding 6,7-dihydro-8-(β-acetoxyethyl)pyrido[1,2-a] indol-9(8H)-ones and acrylamide, are described. The end products are useful as anti-inflammatory and analgesic agents.

BRIEF SUMMARY OF THE INVENTION

The invention relates to compounds characterized by the formula

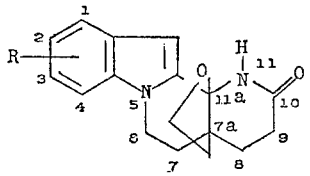

wherein R is hydrogen, amino, nitro, halogen, hydroxy, lower alkyl or lower alkoxy.

In another aspect, the invention relates to the preparation of the compounds of formula I by reacting a compound characterized by the formula

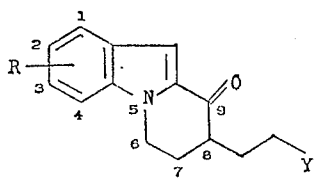

wherein R is as previously described, and Y is hydroxy or acyloxy, with acrylamide.

In yet another aspect, the invention relates to the preparation of the compounds of formula II by heating a compound characterized by the formula

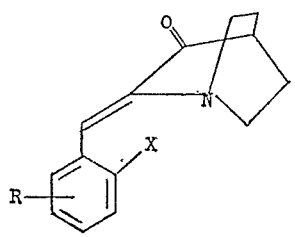

wherein R is as previously described and X is halogen, with a nucleophilic agent.

DETAILED DESCRIPTION OF THE INVENTION

The invention relates to compounds of the formula

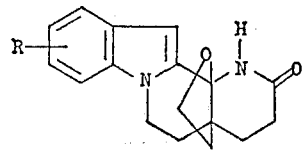

wherein R is hydrogen, amino, nitro, halogen, hydroxy, lower alkyl or lower alkoxy, and a process for the preparation thereof.

Exemplary of the compounds of formula I are:

6,7,8,9-tetrahydro-7a,11a-ethanooxyindolo-[1,2-h] [1,7] naphthyridin-10(11H)-one;
2-nitro-6,7,8,9-tetrahydro-7a,11a-ethanooxyindolo[1,2-h] [1,7]naphthyridin-10(11H)-one;
2-amino-6,7,8,9-tetrahydro-7a,11a-ethanooxyindolo-[1,2-h][1,7]naphthyridin-10(11H)-one
1-chloro-6,7,8,9-tetrahydro-7a,11a-ethanooxyindolo [1,2-h][1,7]naphthyridin-10(11H)-one;
3-chloro-6,7,8,9-tetrahydro-7a,11a-ethanooxyindolo [1,2-h][1,7]naphthyridin-10(11H)-one;
2-methyl-6,7,8,9-tetrahydro-7a,11a-ethanooxyindolo [1,2-h][1,7]naphthyridin-10(11H)-one;
2-methoxy-6,7,8,9-tetrahydro-7a,11a-ethanooxyindolo [1,2-h][1,7]naphthyridin-10(11H)-one;
3-hydroxy-6,7,8,9-tetrahydro-7a,11a-ethanooxyindolo [1,2-h][1,7]naphthyridin-10(11H)-one;
3-ethyl-6,7,8,9-tetrahydro-7a,11a-ethanooxyindolo [1,2-h][1,7]naphthyridin-10(11H)-one;
2-ethoxy-6,7,8,9-tetrahydro-7a,11a-ethanooxyindolo [1,2-h][1,7]naphthyridin-10(11H)-one;

and the like.

As used herein, the term "lower alkyl" denotes a straight or branched chain saturated hydrocarbon containing 1 to 7 carbon atoms, for example, methyl, ethyl, propyl, isopropyl, butyl, t-butyl, neopentyl, pentyl, heptyl, and the like. The term "lower alkoxy" denotes an alkyl ether group in which the lower alkyl group is as described above, for example, methoxy, ethoxy, propoxy, pentoxy, and the like. The term "halogen" denotes all the halogens, i.e., bromine, chlorine, fluorine and iodine. The term "acyl" denotes an "alkanoyl" group derived from an aliphatic carboxylic acid of 1 to 7 carbon atoms, for example, formyl, acetyl, propionyl, and the like; and an "aroyl" group derived from an aromatic carboxylic acid, such as benzoyl and the like. The term "nucleophilic agent" denotes a halide, an alkoxide, an acylate or the like; preferred is an acetate, such as an alkali metal acetate.

The compounds of formula I are prepared by treating a compound of the formula

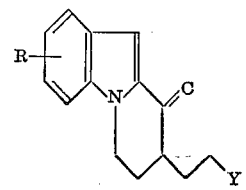

wherein R and Y are as previously described,
with acrylamide in an inert organic solvent, for example, an ether such as dioxane, tetrahydrofuran or the like, an alkanol such as methanol, ethanol, propanol, or the like, diglyme, mixtures thereof, or the like, at a temperature in the range of from about room temperature to the reflux temperature of the reaction mixture, preferably at the reflux temperature, in the presence of an alkali metal alkoxide such as potassium t-butoxide, sodium methoxide, or the like. The compound of formula I which is formed can be recovered utilizing conventional methods, for example, by crystallization, filtration, or the like.

The compounds of formula II are prepared by treating a compound of the formula

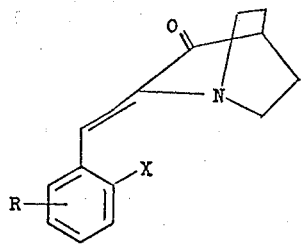

III wherein R is as previously described and X is halogen, with a nucleophilic agent, for example, an alkali metal halide, an alkali metal alkoxide, or an alkali metal acylate, such as potassium acetate or the like, at a temperature in the range of from about 100° and the reflux temperature of the reaction mixture, preferably at the reflux temperature, in an aprotic organic solvent, for example, diglyme, triglyme, dioxane, dimethylformamide, dimethylsulfoxide, or the like.

If the nucleophilic agent is an alkali metal halide or an alkali metal alkoxide, there is first formed a compound of the formula

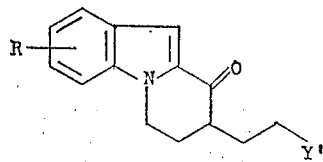

IIa wherein Y' is halogen or lower alkoxy, respectively.

A compound of formula IIa wherein Y' is halogen can then be converted to the compound of formula II wherein Y is hydroxy by hydrolysis, utilizing an alkali metal hydroxide, such as sodium hydroxide. A compound of formula IIa wherein Y' is lower alkoxy can then be converted to a compound of formula II wherein Y is acyloxy utilizing a mineral acid, for example, a hydrohalic acid such as hydrobromic acid or the like, in a carboxylic acid such as acetic acid. Alternatively, a compound of formula II, wherein Y is acyloxy, can also be prepared from the corresponding compound of formula II, wherein Y is hydroxy, by reaction with an acid halide or anhydride, for example, benzyl chloride, or the like.

Also within the scope of the invention are compounds of the formula

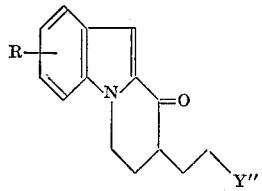

IIb wherein R is as previously described and Y'' is halo, hydroxy, lower alkoxy or acyloxy.

The compound of formula II can then be utilized without further separation in the preparation of the compound of formula I or can be separated utilizing conventional procedures, such as crystallization, filtration, or the like.

The starting materials, i.e., the compounds of formula III, for the preparation of the compounds of formula II are not known compounds, but can be prepared according to known procedures, for example, by the condensation of 3-quinuclidinone with an appropriately substituted ortho-halobenzaldehyde of the formula

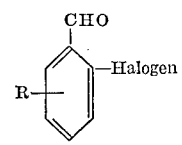

(IV)

wherein R is as previously described.

The 3-quinuclidinone hydrochloride and the benzaldehyde derivatives used are known compounds or can be prepared according to known procedures. The condensation is conveniently carried out by treating an equimolar mixture of the reactants with a base, for example, an alkali metal alkoxide, such as sodium ethoxide, in an organic solvent, for example, an alkanol such as ethanol. Thereafter, the desired products of formula II are recovered by known procedures.

Exemplary of the compounds of formula III are:

2-(o-fluorobenzylidene)-3-quinuclidinone;
2-(2-chloro-5-nitrobenzylidene)-3-quinuclidinone;
2-(2,6-dichlorobenzylidene)-3-quinuclidinone;
2-(2,4-dichlorobenzylidene)-3-quinuclidinone;
2-(2-chloro-5-methylbenzylidene)-3-quinuclidinone;
2-(2-chloro-5-methoxybenzylidene)-3-quinuclidinone;
2-(2-chloro-4-hydroxybenzylidene)-3-quinuclidinone;
2-(fluoro-4-ethylbenzylidene)-3-quinuclidinone;
2-(2-chloro-5-ethoxybenzylidene)-3-quinuclidinone;

and the like.

The compounds of formula II are novel compounds and are exemplified by the following:

6,7-dihydro-8-(β-acetoxyethyl)-pyrido[1,2-a]indol-9(8H)-one;
2-nitro-6,7-dihydro-8-(β-acetoxyethyl)-pyrido[1,2-a]indol-9(8H)-one;
1-chloro-6,7-dihydro-8-(β-acetoxyethyl)-pyrido[1,2-a]indol-9(8H)-one;
3-chloro-6,7-dihydro-8-(β-acetoxyethyl)-pyrido[1,2-a]indol-9(8H)-one;
2-methyl-6,7-dihydro-8-(β-acetoxyethyl)-pyrido[1,2-a]indol-9(8H)-one;
2-methoxy-6,7-dihydro-8-(β-acetoxyethyl)-pyrido[1,2-a]indol-9(8H)-one;
3-hydroxy-6,7-dihydro-8-(β-acetoxyethyl)-pyrido[1,2-a]indol-9(8H)-one;

and the like.

The compounds of formula I possess analgesic and anti-inflammatory properties and are therefore useful as anti-inflammatory and analgesic agents. Their pharmacologically useful analgesic and anti-inflammatory activity is demonstrated in warm-blooded animals utilizing standard procedures, i.e., rats in which inflammation is produced by the injection of 0.1 ml. of a 20% suspension of brewer's yeast under the plantar surface of the rat's foot. The pain threshold is measured as the amount of pressure in mm. Hg required to induce the flight reaction (struggle) when applied to the foot. Air pressure from an air line is admitted through a needle valve to a 10 ml. syringe mounted with the plunger directed downward to which is connected a short bullet-shaped metal peg. The pressure is applied through the metal tip to the plantar surface of the rat's foot at the rate of 20 mm. Hg per second. The end point is reached when the rat struggles. There are six groups of 5 rats/group run at a time. One group of 5 rats acts as control. Measurement made is pain threshold as the amount of pressure in mm. Hg required to induce the flight reaction. Pain results are obtained by subtracting control pressure readings from treated pressure readings for the inflamed feet. Results are expressed as change in pain threshold in mm. of Hg in inflamed foot and $ED_{50}$.

When 6,7,8,9 - tetrahydro - 7a,11a - ethanooxyindolo-[1,2-h][1,7]naphthyridin-10(11H)-one is utilized as the test substance, an $ED_{50}$ of 200 mg./kg. is observed.

When 2-nitro-6,7,8,9-tetrahydro - 7a,11a - ethanooxyindolo-[1,2-h][1,7]naphthyridin-10(11H)-one is utilized as the test substance, an $ED_{50}$ of 25 mg./kg. is observed.

For use as analgesics and anti-inflammatory agents, the presently discolsed compounds are formulated, using conventional inert pharmaceutical adjuvant materials, into dosage forms which are suitable for oral or parenteral administration. Such dosage forms include tablets, suspensions, solutions, etc. Furthermore, the compounds of this invention can be embodied into, and administered in the form of, suitable hard or soft capsules. The identity of the inert adjuvant materials which are used in formulating the present compounds into oral and parenteral dosage forms will be immediately apparent to persons skilled in the art. These adjuvant materials, either inorganic or organic in nature, include, for example, water, gelatin, lactose, starch, magnesium stearate, talc, vegetable oils, gums, polyalkylene glycols, etc. Moreover, preservatives, stabilizers, wetting agents, emulsifying agents, salts for altering osmotic pressure, buffers, etc. can be incorporated, if desired, into such formulations.

Since the compounds of formulas I and II possess an asymmetric carbon atom, they are ordinarily obtained as racemic mixtures. The resolution of such racemates into the optically active isomers can be carried out by known procedures. Some racemic mixtures can be precipitated as eutectics and can thereafter be separated. Chemical resolution is, however, preferred.

The compounds of formula I are converted by hydrolysis into carboxylic acids of the formula

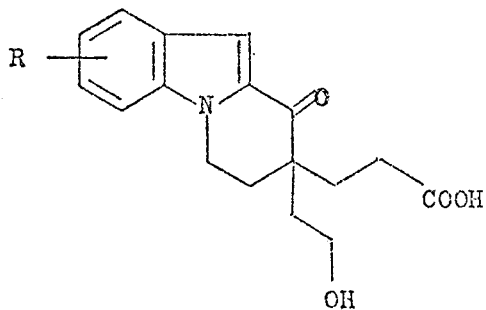

wnerein R is as previously descibed.

Diastereomeric salts are formed by treating the acids of formula V with an optically active amine such as d-(+)- or l-(—)-alpha-phenylethylamine, brucine or the like. The formed diastereomers are separated by selective crystallization and then are converted to the corresponding optical isomer. Transformation of the optically active carboxylic acids of formula V to optically active compounds of formula I is effected by conversion to the corresponding carboxamides using standard procedures, followed by treatment with anhydrous potassium carbonate in boiling chlorobenzene. Thus, the invention covers the racemates of the compounds of formula I or II as well as their optically active isomers.

The following examples further illustrate the invention. All temperatures are in degrees centigrade, unless otherwise mentioned.

EXAMPLE 1

Preparation of 6,7-dihydro-8-($\beta$-acetoxyethyl)-pyrido[1,2-a]indol-9(8H)-one

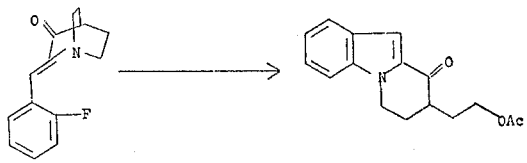

A mixture consisting of 2-(o-fluorobenzylidene)-3-quinuclidinone (209 g.) and potassium acetate (209 g.) in diglyme (1 l.) was heated to reflux with stirring under an argon atmosphere for 20 hours. The mixture was cooled and then diluted by adding ice and water (about 2 l.). Thereafter, the mixture was extracted with a 2 l. portion of benzene and the organic layer washed several times with water to remove diglyme. This benzene solution of the product was treated with activated charcoal to remove dark impurities, dried and evaporated. The residue was taken up in ether (300 ml.), scratched and chilled to give a total of 172.5 g. (75 percent yield) of 6,7-dihydro - 8 - ($\beta$-acetoxyethyl) - pyrido[1,2 - a]indol-9(8H)-one in three crops. An analytical sample crystallized from ether in colorless crystals with m.p. 74–76°.

*Analysis.*—Calcd. for $C_{16}H_{17}NO_3$: C, 70.83; H, 6.31; N, 5.16. Found: C, 70.65; H, 6.50; N, 4.99.

EXAMPLE 2

Preparation of 2-nitro-6,7-dihydro-8-($\beta$-acetoxyethyl)-pyrido[1,2-a]indol-9(8H)-one

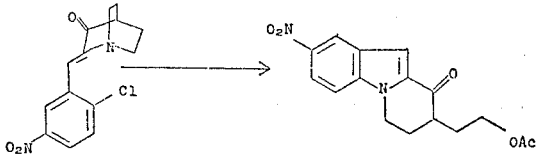

A mixture of 2-(2-chloro-5-nitrobenzylidene)3-quinuclidinone (28.6 g.) and potassium acetate (28.6 g.) in diglyme (250 ml.) was heated to reflux with stirring under an argon atmosphere for 4 hours. The reaction mixture was worked up as in Example 1 and the product also crystallized from ether to give 13.5 g. (49 percent yield) of 2-nitro-6,7-dihydro-8-($\beta$-acetoxyethyl)-pyrido[1,2-a]indol-9(8H)-one as pale yellow crystals with m.p. 151–152°.

*Analysis.*—Calcd. for $C_{16}H_{16}N_2O_5$: C, 60.76; H, 5.10; N, 8.86. Found: C, 60.72; H, 5.14; N, 8.77.

EXAMPLE 3

Preparation of (a) 1-chloro-6,7-dihydro-8-($\beta$-acetoxyethyl) - pyrido[1,2-a]indol - 9(8H) - one and (b) 1'-chloro - 6,7 - dihydrospiro - [cyclopropane - 1,8'-pyrido[1,2-a]indol]-9'(8'H)-one

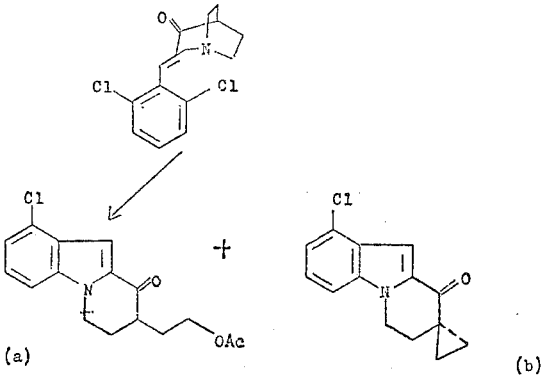

(A) A mixture of 2 - (2,6 - dichlorobenzylidene)-3-quinuclidinone (95 g.), potassium acetate (95 g.) and triglyme (1 l.) was heated and stirred under reflux in an argon atmosphere for 18 hours. Workup as in Example 1 provided 56 g. of an oily mixture of 1-chloro-6,7-dihydro - 8 - β - acetoxyethyl) - pyrido[1,2-a]indol - 9 (8H)-one and 1'-chloro-6,7-dihydrospiro-[cyclopropane-1,8'-pyrido[1,2-a]indol]-9'(8'H)-one, of which the latter was the major product. Fractional crystallization and column chromatography afforded 35.8 g. (43 percent) of pure 1'-chloro-6,7-dihydrospiro-[cyclopropane-1,8'-pyrido[1,2-a]indol] - 9'(8'H) - one which crystallized from methylene chloride/ether as colorless crystals with m.p. 118–120°.

*Analysis.*—Calcd. for $C_{14}H_{12}ClNO$: C, 68.44; H, 4.92; N, 5.70; Cl, 14.43. Found: C, 68.22; H, 4.86; N, 5.59; Cl, 14.43.

(B) A mixture of 2 - (2,6 - dichlorobenzylidene)-3-quinuclidinone (44 g.), potassium acetate (44 g.) and tetramethylammonium chloride (4.4 g.) in triglyme heated and worked up as above gave again an oily mixture of 1-chloro-6,7-dihydro-8-(β-acetoxyethyl)-pyrido[1,2-a]indol-9(8H)-one and 1'-chloro-6,7-dihydrospiro-[cyclopropane - 1,8' - pyrido[1,2-a]indol] - 9'(8'H)-one. However, under these conditions, 1-chloro-6,7-dihydro-8-(β-acetoxyethyl)-pyrido[1,2-a]indol-9(8H)-one was the major product and 12.7 g. (27 percent) was obtained pure by direct crystallization. Crystallization from methylene chloride/ether provided colorless crystals of 1-chloro-6,7-dihydro - 8 - (β - acetoxyethyl) - pyrido[1,2-a]indol - 9 (8H)-one with m.p. 77–78°.

*Analysis.*—Calcd. for $C_{16}H_{16}ClNO_3$: C, 62.85; H, 5.27; N, 4.58; Cl, 11.60. Found: C, 62.97; H, 5.16; N, 4.50; Cl, 11.58.

EXAMPLE 4

Preparation of (c) 3-chloro-6,7-dihydro-8-(β-acetoxyethyl) - pyrido[1,2-a]indol - 9(8H) - one and (d) 3'-chloro - 6,7 dihydrospiro - (cyclopropane - 1,8'-pyrido[1,2-a]indol)-9'(8H)-one

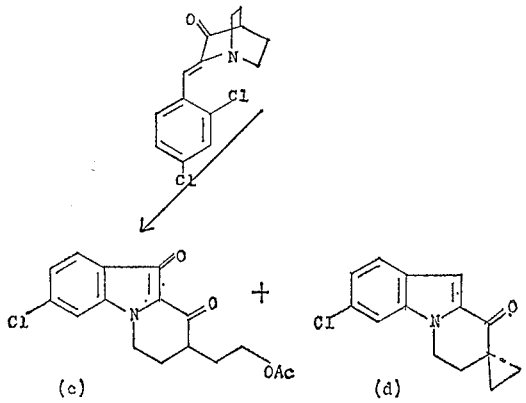

A mixture of 2-(2,4-dichlorobenzylidene)-3-quinuclidine (56 g.) and potassium acetate (56 g.) in triglyme (500 ml.) was heated and stirred under reflux in an argon atmosphere for 18 hours. Reaction workup as in Example 1 gave an oily mixture of 3-chloro-6,7-dihydro-8-(β-acetoxyethyl)-pyrido[1,2-a]indol-9(8H)-one and 3'-chloro - 6,7 - dihydrospiro - (cyclopropane - 1,8' - pyrido[1,2-a]indol)-9'(8'H)-one. This mixture was taken up in ether and chilled to give 15.8 g. (26 percent) of 3-chloro-6,7 - dihydro - 8 - (β - acetoxyethyl) - pyridol[1,2-a]indol-9(8H)-one.

Recrystallization from methylene chloride/cyclohexane gave colorless crystals of 3-chloro-6,7-dihydro-8-(β-acetoxyethyl)-pyrido[1,2-a]indol)-9(8H)-one with m.p. 119–120°.

*Analysis.*—Calcd. for $C_{16}H_{16}ClNO_3$: C, 62.85; H, 5.27; N, 4.58; Cl, 11.60. Found: C, 62.88; H, 5.42; N, 4.41; Cl, 12.28.

Column chromatography of the mother liquor on silica gel provided 3.5 g. (7 percent) of pure 3'-chloro-6,7-dihydrospiro - (cyclopropane - 1,8' - pyrido[1,2-a]indol)-9' (8'H)-one plus some additional 3-chloro-6,7-dihydro-8-(β-acetoxyethyl)pyrido[1,2-a]indol-9(8H)-one. 3'-chloro-6,7 - dihydrospiro - (cyclopropane - 1,8' - pyrido[1,2-a]indol)-9'(8'H)-one crystallized from methylene chloride/cyclohexane in pale yellow crystals with m.p. 125–126°.

*Analysis.*—Calcd. for $C_{14}H_{12}ClNO$: C, 68.44; H, 4.92; N, 5.70; Cl, 14.43. Found: C, 68.50; H, 5.02; N, 5.53; Cl. 14.58.

EXAMPLE 5

Preparation of 6,7,8,9-tetrahydro-7a,11a-ethanooxyindolo[1,2-h][1,7]naphthyridin-10(11H)-one

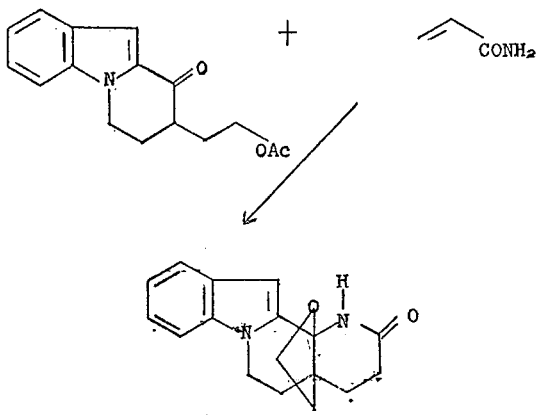

A solution of 6,7-dihydro - 8 - (β-acetoxyethyl)-pyrido-[1,2-a]indol - 9(8H) - one (0.56 mole) and acrylamide (0.59 mole) in dioxane (1.5 l.) was treated with 0.56 mole potassium t-butoxide in portions and the resulting mixture stirred and heated under reflux for 1 hour. At this point ethanol (1.5 l.) and an additional equivalent of potassium t-butoxide were added and reflux was continued for 1–9 hours.

The solvent was evaporated from the cooled reaction mixture under reduced pressure and the residue was partitioned between methylene chloride and water. The residue from the dried methylene chloride extract was triturated with ether, chilled, filtered and washed with more ether.

6,7,8,9 - tetrahydro - 7a,11a - ethanooxyindolo[1,2-h][1,7]naphthyridin - 10(11H) - one was thus obtained in 61 percent yield after 9 hours of refluxing. A sample recrystallized from methylene chloride/ether gave colorless crystals of 6,7,8,9 - tetrahydro - 7a,11a - ethanoxyindolo-[1,2-h][1,7]naphthyridin-10(11H)-one with m.p. 233–234°.

*Analysis.*—Calcd. for $C_{17}H_{18}N_2O_2$: C, 72.32; H, 6.43; N, 9.92. Found: C, 72.47; H, 6.36; N, 9.86.

In a similar manner to Example 5, the following compounds were prepared:

From 2 - nitro - 6,7 - dihydro - 8 - (β-acetoxyethyl)-pyrido[1,2-a]indol - 9(8H) - one, there was obtained 2-nitro - 6,7,8,9 - tetrahydro - 7a,11a - ethanooxyindolo-[1,2-h][1,7]naphthyridin - 10(11H) - one in 42 percent yield after 1 hour reflux. A sample recrystallized from methylene chloride/ether in fine yellow needles with m.p. 156–159°.

*Analysis.*—Calcd. for $C_{17}H_{17}N_3O_4$: C, 62.38; H, 5.24; N, 12.84. Found. C, 62.54; H, 5.26; N, 12.65.

From 1-chloro - 6,7 - dihydro - 8 - (β-acetoxyethyl)-pyrido[1,2-a]indol - 9(8H) - one, there was obtained 1-chloro - 6,7,8,9 - tetrahydro - 7a,11a - ethanooxyindolo-[1,2-a][1,7]naphthyridin - 10(11H) - one in 53 percent yield after 1 hour reflux. A sample recrystallized from methylene chloride/ether in colorless crystals with m.p. 157–160°.

*Analysis.*—Calcd. for $C_{17}H_{17}ClN_2O_2$: C, 64.45; H, 5.41; N, 8.84; Cl, 11.19. Found: C, 63.73; H, 5.43; N, 8.70; Cl, 11.08.

From 3-chloro - 6,7 - dihydro - 8 - (β-acetoxyethyl)-pyrido[1,2-a]indol - 9(8H) - one, there was obtained 3-chloro - 6,7,8,9 - tetrahydro - 7a,11a - ethanooxyindolo-[1,2-h][1,7]naphthyridin - 10(11H) - one in 58 percent yield after 3 hours of reflux. A sample recrystallized from chlorobenzene was obtained in fine, colorless needles with m.p. 229–230°.

*Analysis.*—Calcd. for $C_{17}H_{17}ClN_2O_2$: C, 64.47; H, 5.41; N, 8.85; Cl, 11.19. Found: C, 64.28; H, 5.22; N, 8.87; Cl, 11.36.

EXAMPLE 6

Preparation of 2-(o-fluorobenzylidene)-3-quinuclidinone

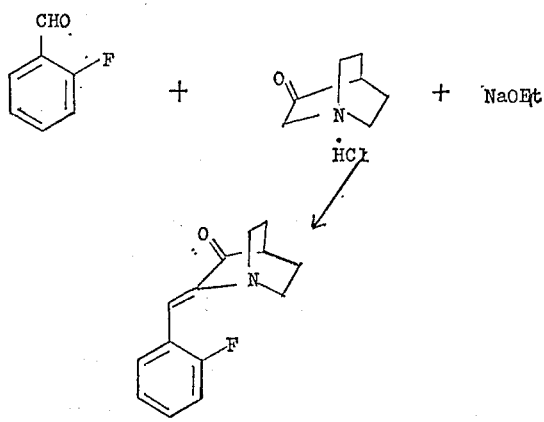

A solution of sodium (30 g.) in ethanol (1 l.) was treated with 3-quinuclidinone hydrochloride (1 mole) and o-fluorobenzaldehyde (1 mole) and the resulting yellow mixture heated on the steam bath for 5 minutes with frequent stirring. The mixture was then slowly diluted with cold water (4 l.) and chilled overnight. The product was filtered out, thoroughly washed with water and air-dried to give 209 g. (91 percent yield) of 2-(o-fluoro-benzylidene)-3-quinuclidinone. A sample recrystallized from ethanol gave yellow crystals with m.p. 118–119°.

*Analysis.*—Calcd. for $C_{14}H_{14}FNO$: C, 72.71; H, 6.11; N, 6.06. Found: C, 72.82; H, 6.11; N, 6.13.

EXAMPLE 7

Capsule formulation

| | Per capsule, mg. |
|---|---|
| 6,7,8,9-tetrahydro-7a,11a-ethanooxyindolo [1,2-h][1,7]naphthyridin-10(11H)-one | 250 |
| Lactose | 60 |
| Corn starch | 35 |
| Magnesium stearate | 5 |
| Total weight | 350 |

Procedure.—All of the ingredients are mixed until thoroughly blended in a suitable size container. The powder is then filled into No. 2, two piece, hard shell gelatin capsules to an approximate fill weight of 350 mg. using a capsulating machine.

EXAMPLE 8

Tablet formulation

| | Per tablet, mg. |
|---|---|
| 6,7,8,9-tetrahydro-7a,11a-ethanooxyindolo[1,2-h] [1,7]naphthyridin-10(11H)-one | 200 |
| Dicalcium phosphate dihydrate, unmilled | 235 |
| Corn starch | 70 |
| FD and C Yellow No. 5—Aluminum Lake 25 percent | 2 |
| A mixture of di- and tri-$C_{16}$–$C_{18}$ fatty acid esters of glycerin | 25 |
| Calcium stearate | 3 |
| Total weight | 535 |

Procedure.—All the ingredients are mixed thoroughly and Fitzed (Model D) using a No. 1A screen, medium speed. The mixture is then remixed and slugged. The slugs are screened on an oscillator through a No. 14 mesh screen and compressed on an "E" machine.

EXAMPLE 9

Capsule formulation

| | Per capsule, mg. |
|---|---|
| 6,7,8,9-tetrahydro-7a,11a-ethanooxyindolo[1,2-h] [1,7]naphthyridin-10(11H)-one | 50 |
| Lactose, U.S.P. | 125 |
| Corn starch, U.S.P. | 30 |
| Talc, U.S.P. | 5 |
| Total weight | 210 |

Procedure.—6,7,8,9-tetrahydro - 7a,11a - ethanooxyindolo[1,2-h][1,7]naphthyridin-10(11H)-one is mixed with lactose and corn starch in a suitable mixer. The mixture is further blended by passing through a Fitzpatrick Comminuting Machine with a No. 1A screen with knives forward. The blended powder is then returned to the mixer. The talc is added and blended thoroughly. The mixture is filled into No. 4 hard shell gelatin capsules on a capsulating machine.

EXAMPLE 10

Tablet formulation

| | Per tablet, mg. |
|---|---|
| 6,7,8,9-tetrahydro-7a,11a-ethanooxyindolo[1,2-h] [1,7]naphthyridin-10(11H)-one | 25 |
| Dicalcium phosphate dihydrate, unmilled | 175 |
| Corn starch | 24 |
| Magnesium stearate | 1 |
| Total weight | 225 |

Procedure.—6,7,8,9-tetrahydro - 7a,11a - ethanooxyindolo[1,2-h][1,7]naphthyridin - 10(11H) - one and corn starch are mixed together and passed through a No. 00 screen in Model "J" Fitzmill with hammers forward. This premix is then mixed with dicalcium phosphate and one-half of the magnesium stearate, passed through a No. 1A screen in Model "J" Fitzmill with knives forward and slugged. The slugs are passed through a No. 2A plate in a Model "D" Fitzmill at slow speed with knives forward, and the remaining magnesium stearate is added. The mixture is mixed and compressed.

EXAMPLE 11

Tablet formulation

| | Per tablet, mg. |
|---|---|
| 6,7,8,9-tetrahydro - 7a,11a - ethanooxyindola[1,2-h] [1,7]naphthyridin-10(11H)-one | 100 |
| Lactose, U.S.P. | 202 |
| Corn starch, U.S.P. | 80 |
| Prehydrolyzed food grade corn starch | 20 |
| Calcium stearate | 8 |
| Total weight | 410 |

Procedure.—6,7,8,9 - tetrahydro-7a,11a - ethanooxyindolo[1,2-h][1,7]naphthyridin-10(11H)-one, lactose, corn starch and prehydrolyzed food grade corn starch are blended in a suitable mixer. The mixture is then granulated to a heavy paste with water and the moist mass is passed through a No. 12 screen. It is then dried overnight at 110° F. The dried granules are passed through a No. 16 screen and transferred to a suitable mixer. The calcium stearate is added and mixed until uniform. The mixture is compressed at a tablet weight of 410 mg. using tablet punches having a diameter of approximately ⅜″. (Tablets may be either flat or biconvex and may be scored if desired.)

EXAMPLE 12

Tablet formulation

| | Per tablet, mg. |
|---|---|
| 6,7,8,9-tetrahydro - 7a,11a - ethanooxyindola[1,2-h][1,7]naphthyridin-10(11H)-one | 500 |
| Corn starch | 30 |
| Lactose | 88 |
| Gelatin | 12 |
| Talcum | 15 |
| Magnesium stearate | 5 |
| Total weight | 650 |

Procedure.—6,7,8,9-tetrahydro - 7a,11a - ethanooxyindolo[1,2-h][1,7]naphthyridin-10(11H)-one and lactose are thoroughly mixed in suitable blending equipment and granulated with a 10 percent gelatin solution. The moist mass is passed through a No. 12 screen, and the granules are dried on paper-lined trays overnight. The dried granules are passed through a No. 14 screen and placed in a suitable mixer. The talcum and magnesium stearate are added and blended. The granulation is compressed into tablets weighing approximately 650 mg. each, using punches having an approximate diameter of 12.7 mm. (½″). The final tablet thickness is about 5.1 mm.

What is claimed is:

1. A compound of the formula

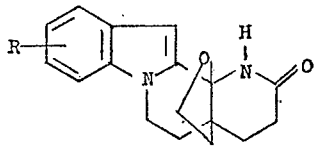

wherein R is hydrogen, amino, nitro, halogen, hydroxy, lower alkyl or lower alkoxy.

2. A compound in accordance with claim 1, 6,7,8,9-tetrahydro-7a,11a - ethanooxyindolo - [1,2-h][1,7]naphthyridin-10(11H)-one.

3. A compound in accordance with claim 1, 2-nitro-6,7,8,9-tetrahydro-7a,11a - ethanooxyindolo[1,2-h][1,7]naphthyridin-10(11H)-one.

4. A compound in accordance with claim 1, 1-chloro-6,7,8,9 - tetrahydro - 7a,11a-ethanooxyindolo[1,2-h][1,7]naphthyridin-10(11H)-one.

5. A compound in accordance with claim 1, 3-chloro-6,7,8,9-tetrahydro - 7a,11a - ethanooxyindolo[1,2-h][1,7]naphthyridin-10(11H)-one.

6. A process for preparing a compound of the formula

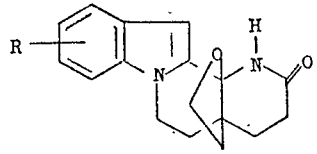

wherein
R is hydrogen, amino, nitro, halogen, hydroxy, lower alkyl or lower alkoxy, which comprises reacting a compound of the formula

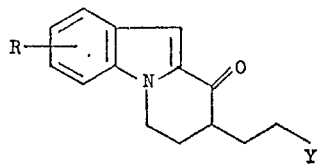

wherein
R is as previously described, and
Y is halo, lower alkoxy or acyloxy, with acrylamide in the presence of an alkali metal alkoxide.

7. A process in accordance with claim 6, wherein the alkali metal alkoxide is potassium t-butoxide.

References Cited

OTHER REFERENCES 3,415,831   12/1968   Weisbach _____ 260—288

G. THOMAS TODD, Primary Examiner

U.S. Cl. X.R.

424—267